United States Patent

Huang

[11] Patent Number: 5,571,051
[45] Date of Patent: Nov. 5, 1996

[54] GOLF CLUB GRIP

[76] Inventor: Ben Huang, 19472 Woodlands La., Huntington Beach, Calif. 92648

[21] Appl. No.: 421,376

[22] Filed: Apr. 12, 1995

[51] Int. Cl.[6] .......................... A63B 53/14; A63B 49/08
[52] U.S. Cl. ............................. 473/302; 273/73 J
[58] Field of Search ........................ 273/81.4, 81.5, 273/81.6, 81 B, 81 D, 73 J, 75, 165; 473/302

[56] References Cited

U.S. PATENT DOCUMENTS

| | | |
|---|---|---|
| 1,441,986 | 1/1923 | Lard . |
| 1,483,847 | 2/1924 | Halkett .................................. 273/81.6 |
| 1,968,064 | 7/1934 | Young . |
| 2,050,176 | 8/1936 | Hammerich . |
| 2,086,062 | 7/1937 | Bray ....................................... 273/73 J |
| 2,149,911 | 3/1939 | East ........................................ 273/81.4 |
| 2,177,143 | 10/1939 | Lamkin . |
| 2,200,626 | 5/1940 | Lamkin . |
| 2,437,404 | 3/1948 | Robinson ............................... 273/81.4 |
| 2,772,090 | 11/1956 | Brandon . |
| 2,877,018 | 3/1959 | Turner ................................... 273/81 B |
| 3,078,097 | 2/1963 | Mitchell . |
| 3,087,729 | 4/1963 | Sullivan ................................. 273/81.5 |
| 3,271,031 | 9/1966 | Mitchell . |
| 3,311,375 | 3/1967 | Onions ................................... 273/81.5 |
| 3,606,325 | 9/1971 | Lamkin .................................. 273/81.5 |
| 4,373,718 | 2/1983 | Schmidt . |
| 5,234,740 | 8/1993 | Reeves et al. . |
| 5,397,123 | 3/1995 | Huang . |

FOREIGN PATENT DOCUMENTS

| | | | |
|---|---|---|---|
| 137448 | 1/1920 | United Kingdom ................ 273/81 B |

Primary Examiner—Sebastiano Passaniti
Attorney, Agent, or Firm—Fulwider Patton Lee & Utecht, LLP

[57] ABSTRACT

A grip for a golf club shaft defined by a resilient strip that is spirally wrapped about the shaft of the golf club to vary the longitudinal profile of the shaft and grip as compared to the original longitudinal profile of the golf club shaft. Such grip may be readily applied by a golfer as a replacement for the original grip. The resilient strip may be spirally wrapped about a sleeve that has been positioned on the golf club shaft or, alternatively, about the bare golf club shaft.

5 Claims, 8 Drawing Sheets

GOLF CLUB GRIP

BACKGROUND OF THE INVENTION

1. Field of the Invention

The present invention relates to an improved golf club grip which may also be utilized with other devices employing shafts or handles.

2. Description of the Prior Art

Conventional golf club grips are molded from a single piece of rubber or synthetic plastic. When it is necessary to replace the original grip, such replacement is difficult and cannot be accomplished by the average golfer. Accordingly, the golfer is required to leave his golf club at a golf shop for several days for application of the replacement grip. Another disadvantage of conventional golf club grips is their tendency to become slippery when dampened, as for example, when playing under rainy conditions or by contact with perspiration formed on the golfer's hands. Slippery contact of a golfer's hands with a golf club grip reduces his control of the golf club. Most conventional golf club grips are formed with a longitudinal profile having constant straight slope or taper extending downwardly from the top of the golf club shaft toward the head of the club. This constant straight slope or taper, however, does not provide the optimum control of the club for all golfers. It is therefore desirable to be able to vary the longitudinal profile of a golf club grip to meet the desires of any particular golfer, i.e., a person with small hands usually obtains better results with a grip of reduced diameter as compared to a person with large hands. Another problem with conventional straight-taper golf club grips is that they do not provide optimum control of a golf club in that they fail to permit the golfer to apply maximum gripping force with the pads of his palms, although the power of a golf swing originates at this point. Yet another problem common to conventional golf club grips is their lack of compressibility which reduces control of the golf club during a swing and induces also fatigue. Still, another problem is that conventional rubber grips are very abrasive. This forces players to wear gloves which results in losing genuine feel and control during play.

SUMMARY OF THE INVENTION

The applicant has developed an improved golf club grip designed to solve the above set forth problems inherent to conventional golf club grips. Specifically, the golf club grip of the present invention may be readily applied by a golfer thereby eliminating the delay and cost involved with replacing a conventional golf club grip. The golf club grip of the present invention also enhances the player's grip on a golf club by providing increased tackiness between the player's hands and the golf club grip. The golf club grip of the present invention also enhances the player's feel and control during play thereby eliminating the need to wear a glove which is needed to protect abrasion of a conventional golf club grip. Additionally, the golf club grip of the present invention permits the longitudinal profile of the grip to assume a desired configuration so as to provide maximum comfort and enhanced control over the golf club during play. The golf club grip of the present invention is preferably formed of a synthetic plastic material that is readily compressible when gripped by a golfer thereby increasing his control over the golf club and also reducing fatigue.

The preferred form of golf club grip embodying the present invention utilizes an elongated resilient strip comprising a layer of a textile, such as felt, bonded to a layer of polyurethane. The felt layer is adhered to and provides strength to the polyurethane layer. The strip is spirally wrapped about a resilient sleeve which has been slipped over the grip-receiving upper portion of a golf club shaft. Such sleeve varies in profile along its longitudinal axis so that, when the strip is wrapped about the sleeve, the longitudinal profile of the sleeve and grip will conform to a desired configuration different than the longitudinal profile of the original conventional grip and shaft. In a second form of the invention, the strip varies in profile along its longitudinal axis so that when the strip is spirally wrapped about the bare golf club shaft, the longitudinal profile of the shaft and grip will conform to a desired profile different than the original profile of a golf club shaft and conventional grip.

DETAILED DESCRIPTION OF THE DRAWINGS

Figure 1:
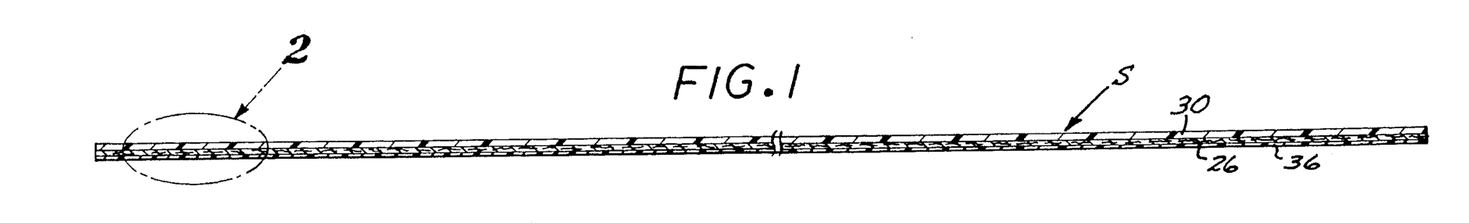
FIG. 1 is a side longitudinal sectional view in reduced scale showing an elongated felt and polyurethane strip utilized in a preferred form of golf club grip embodying the present invention.
Figure 14:
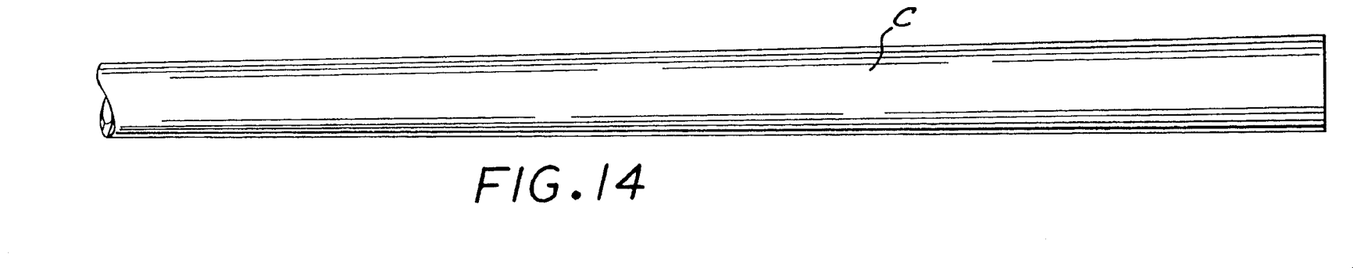
FIG. 14 is a broken side elevational view showing the upper portion of a conventional golf club shaft.

Referring to the drawings, a preferred form of elongated resilient strip S utilized to provide a preferred form of golf club grip of the present invention is shown in FIG. 1. Such strip S is adapted to be applied to the upper portion of the shaft C of a conventional golf club shown in FIG. 14 to provide a golf club grip, four forms of which are shown in FIGS. 18, 19, 23, and 25. The resilient elongated strip S includes an open-pored textile layer, generally designated 26, the upper surface of which is bonded to the lower surface of a closed-pored polyurethane layer, generally designated 30. The resulting elongated strip S is spirally wrapped about the sleeves shown in FIGS. 15 and 16 define a golf club grip (G in FIG. 18 and G-1 in FIG. 19) embodying the present invention.

Figure 7:
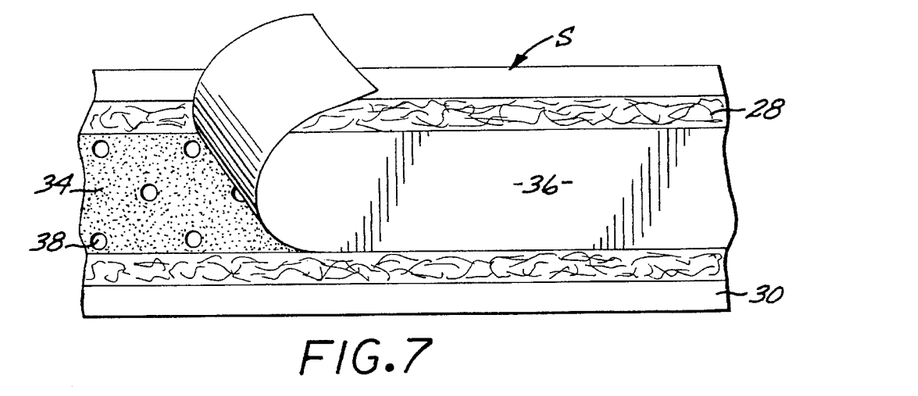
FIG. 7 is a broken view of a portion of FIG. 6 showing a protective quick-release tape being peeled back to uncover an adhesive utilized to secure the strip over the shaft of a golf club.
Figure 8:
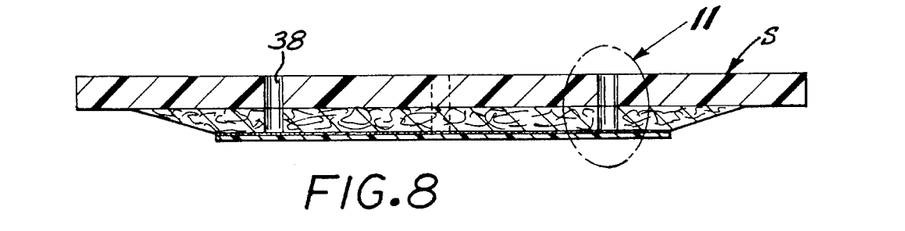
FIG. 8 is a vertical sectional view taken in enlarged scale along 8—8 of FIG. 3.
Figure 9:
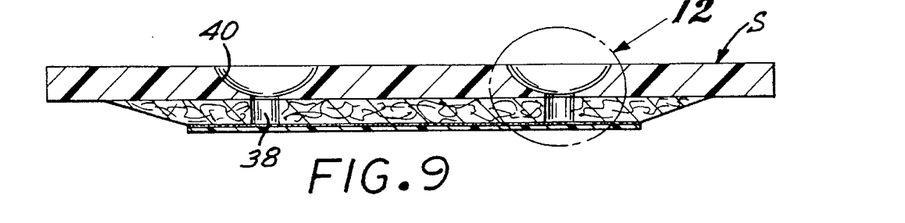
FIG. 9 is a vertical sectional view taken in enlarged scale along 9—9 of FIG. 4.
Figure 11:
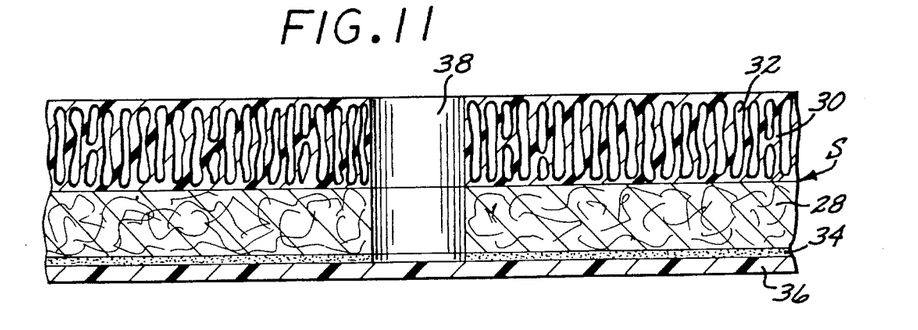
FIG. 11 is a further enlarged view of the encircled area designated 11 in FIG. 8.
Figure 12:
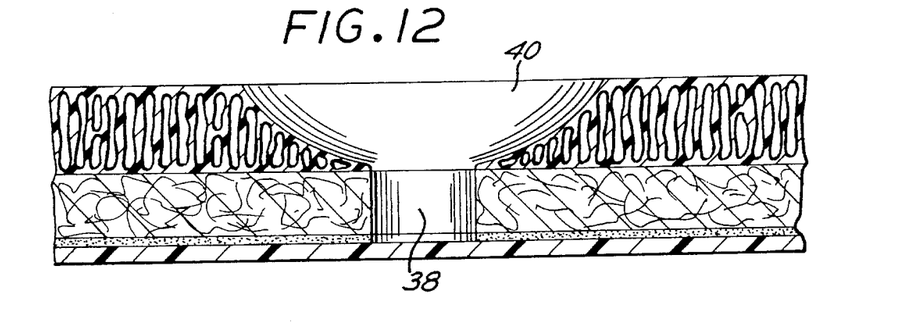
FIG. 12 is a further enlarged view of the encircled area designated 12 in FIG. 9.

More particularly, the textile layer 26 of resilient strip S is formed of a suitable open-pored material, such as felt, and has its upper surface bonded to the lower surface of polyurethane layer 30. As indicated in FIGS. 11 and 12, the polyurethane layer 30 is formed with pores 32 which extend vertically, i.e., generally normal to the longitudinal axis of the strip S. The polyurethane layer 30 may be formed in a conventional manner by coating one side of a felt strip with a solution of polyurethane, e.g., polyester or polyether, dissolved in dimethyl formaide (DMF), immersing the coated strip in water baths to displace the DMF and to cause the urethane to coagulate, and finally driving off the water by the application of water and heat. In this manner, the pores 32 are formed, while the underside of the polyurethane strip is bonded to the upper surface of the felt layer. The underside of the felt layer 26 is provided with a conventional adhesive 34 which is originally covered with a protective quick-release tape 36. To apply the strip to the sleeves of FIGS. 15 or 16 or directly to the bare golf club shaft C, the protective tape 36 is stripped off the adhesive 34, as indicated in FIG. 7, when the strip of bonded-together polyurethane and felt is to be wrapped about the grip-receiving portion of golf club shaft C. The layer of polyurethane 30 provides a cushioned grasp of the player's hands on the shaft C and also enhances the player's grip by providing increased tackiness between the player's hands and the golf club grip, as compared to conventional golf club grips. The felt layer 26 provides strength to the polyurethane layer 30 and also serves as a means for attaching the bonded-together polyurethane and felt strip to a golf club shaft.

Figure 2:
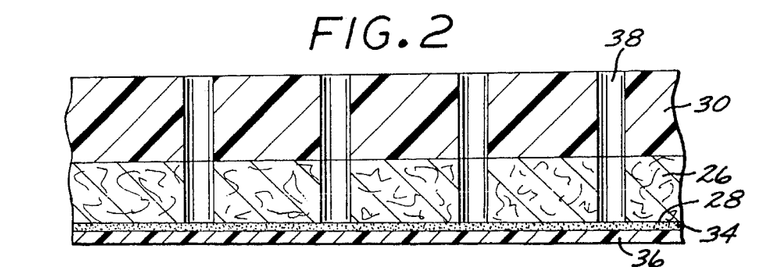
FIG. 2 is a vertical sectional view in enlarged scale of the encircled area designated 2 in FIG. 1.
Figure 3:
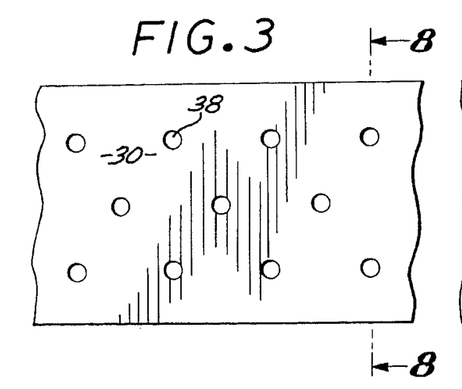
FIG. 3 is a broken top plan view of the strip of FIG. 2 utilizing perforations.
Figure 4:
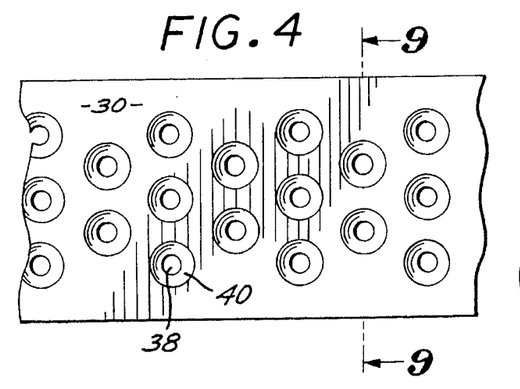
FIG. 4 is a broken top plan view similar to FIG. 3 but showing the strip provided with dimples in addition to the perforations.
Figure 13:
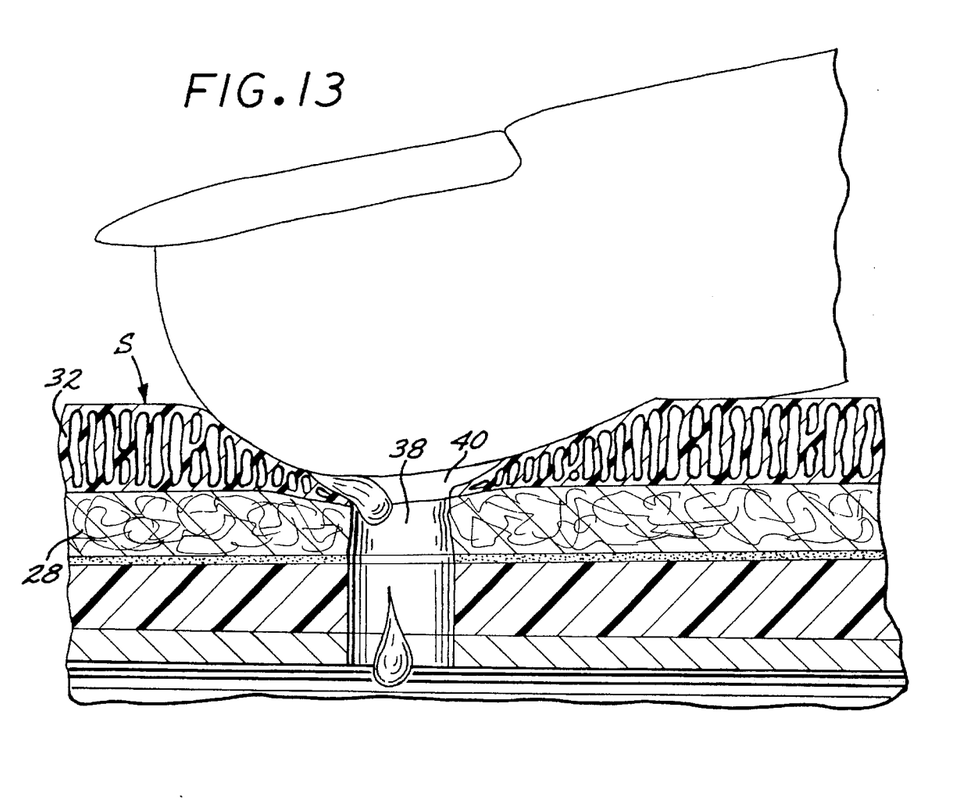
FIG. 13 is a broken sectional view in yet further enlarged scale of FIG. 4 showing how the golf club grip of the present invention deforms when grasped by a user.

To increase the grasp of the golfer's hands to grip G, the polyurethane layer 30 may be provided with a plurality of perforations 38 over its surface. If desired, such perforations may be extended through the felt and polyurethane layers, as shown in FIGS. 2 and 3. Referring to FIGS. 4, 12, and 13, the polyurethane layer 30 may be provided with a plurality of inwardly extending dimples 40, the lower portion of each of which coaxially merges into one of the perforations 38. It has been found that when the grip G is grasped by the golfer with the palm and fingers of the golfer's hand covering the dimples 40, air is first pumped inwardly through vertical passages formed by the dimples 40 and perforations 38 and then into the felt 26. When the golfer relaxes his grasp and uncovers the dimples 40, air will be sucked back through the dimples and perforations to achieve "breathing" of air by the grip. The felt layer permits movement of the air inwardly and outwardly relative to the grip because of its porosity. The interchange of the air as it is pumped through the grip serves to evaporate dampness which can accumulate on the exterior surface of the polyurethane layer when the golfer is playing under rainy conditions, as indicated in FIG. 13. Such interchange of air will also serve to evaporate perspiration which would normally accumulate on the exterior surface of the polyurethane layer. Accordingly, a golfer maintains a better hold on the golf club grip than is true with previously known grips, and his control over the golf club is enhanced even under adverse conditions. It has been determined that good results are obtained where a diameter of about one-eighth inch is utilized for the dimples at the intersection with the outer surface of the polyurethane layer and a diameter of about one-thirty seconds inch is used for the perforations.

Figure 5:
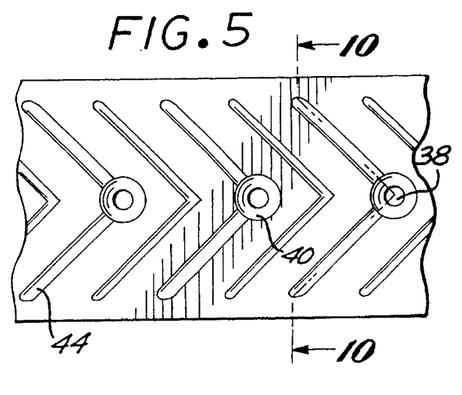
FIG. 5 is a broken top plan view similar to FIGS. 3 and 4 but showing the strip formed with treads in addition to perforations and dimples.
Figure 10:
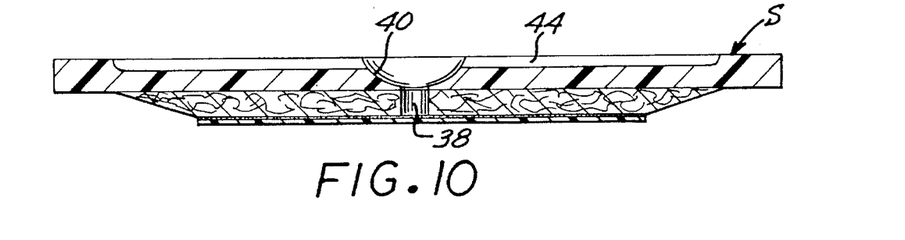
FIG. 10 is a vertical sectional view taken in enlarged scale along 10—10 of FIG. 5.

Referring now to FIGS. 5 and 10, the outer surface of the polyurethane layer 30 may be formed over its upper portion with a plurality of chevron-shaped treads 44 arranged in a herringbone pattern. Preferably, these treads 44 intersect the dimples 40 Such treads channel dampness into the dimples and perforations to further reduce slippage of the golfer's hand on the grip G. Treads 44 also increase the frictional contact of the golfer's hand relative to the grip. The perspiration channeling function of the treads is enhanced by connecting the converging portions of such treads with the dimples and hence the perforations. Preferably, the angles between the longitudinal center-line of grip G and the facing edges of treads 44 will approximate 45°–50°.

Figure 6:
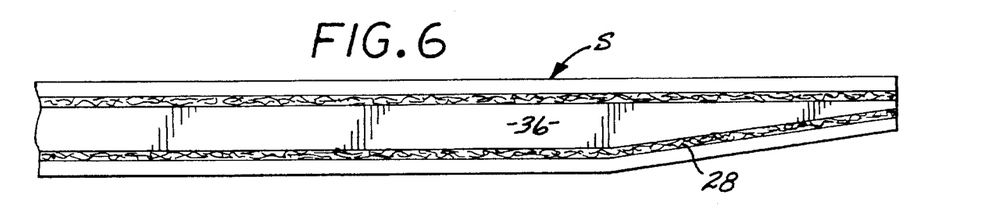
FIG. 6 is a broken view of the under side of the strip of FIG. 1.
Figure 15:
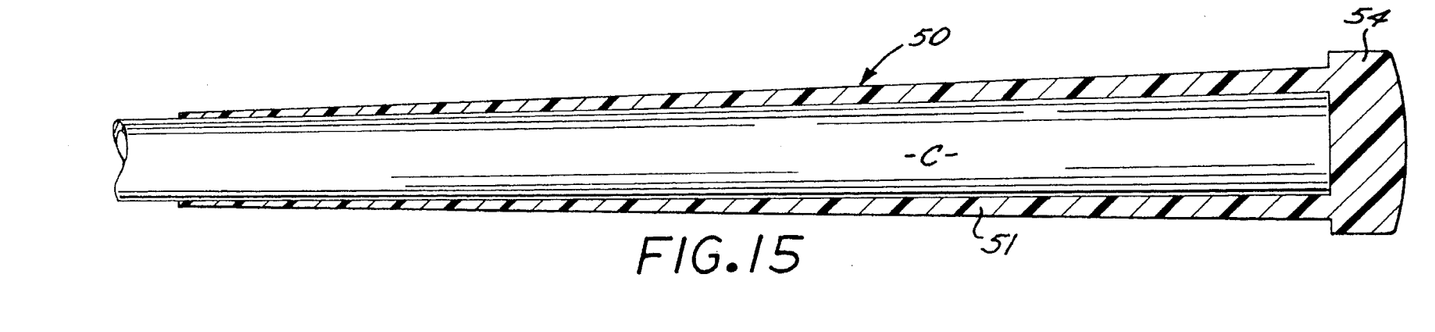
FIG. 15 is a vertical sectional view showing a first form of profile-defining sleeve which is utilized with the resilient strip of FIGS. 1–13.

Referring again to FIG. 1, the height of the resilient strip S remains constant throughout its length. The upper end of such strip S tapers inwardly, as shown in FIG. 6 to facilitate application of the strip to the upper portion of the golf club shaft C shown in FIG. 14. Referring to FIG. 15, in order to obtain the desired longitudinal profile of the grip G when applied to the golf club shaft, a closed constant taper sleeve, generally designated 50, is slipped over the upper portion of the golf club shaft C, (i.e., the end of such shaft remote from the golf club head), and thereafter the strip S is spirally wrapped about the sleeve. As will be apparent from FIG. 15, the slope or taper of the sidewall 51 of sleeve 50 is greater than the slope or taper of the bare golf club shaft C. The sleeve 50 may be of unitary synthetic plastic foam construction utilizing an integral cap 54 which abuts the upper end of the shaft S. The inner diameter of the sleeve 50 should be so selected as to effect a snug fit with the golf club shaft when the sleeve is forced downwardly over such shaft. Alternatively, sleeve 50 may be of a longitudinally split construction.

Figure 17:
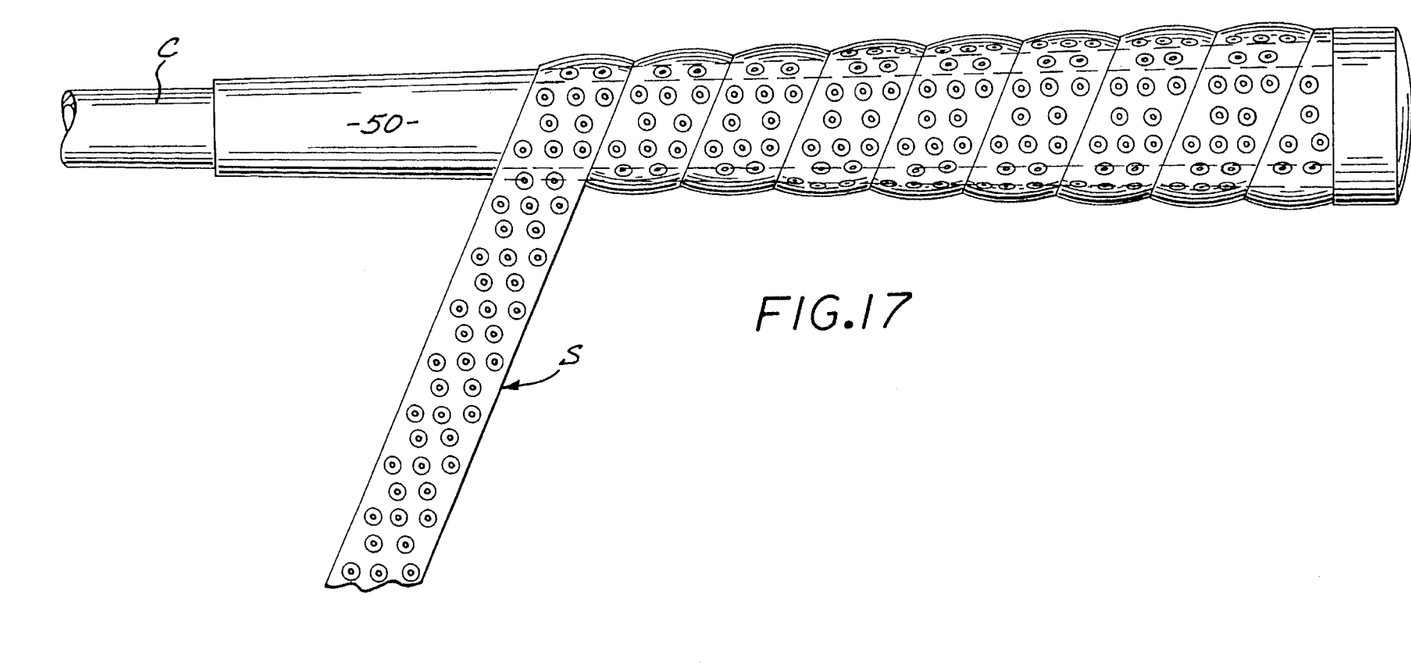
FIG. 17 is a side elevational view showing the resilient strip of FIGS. 1–13 being spirally wrapped about the sleeve of FIG. 15.
Figure 18:
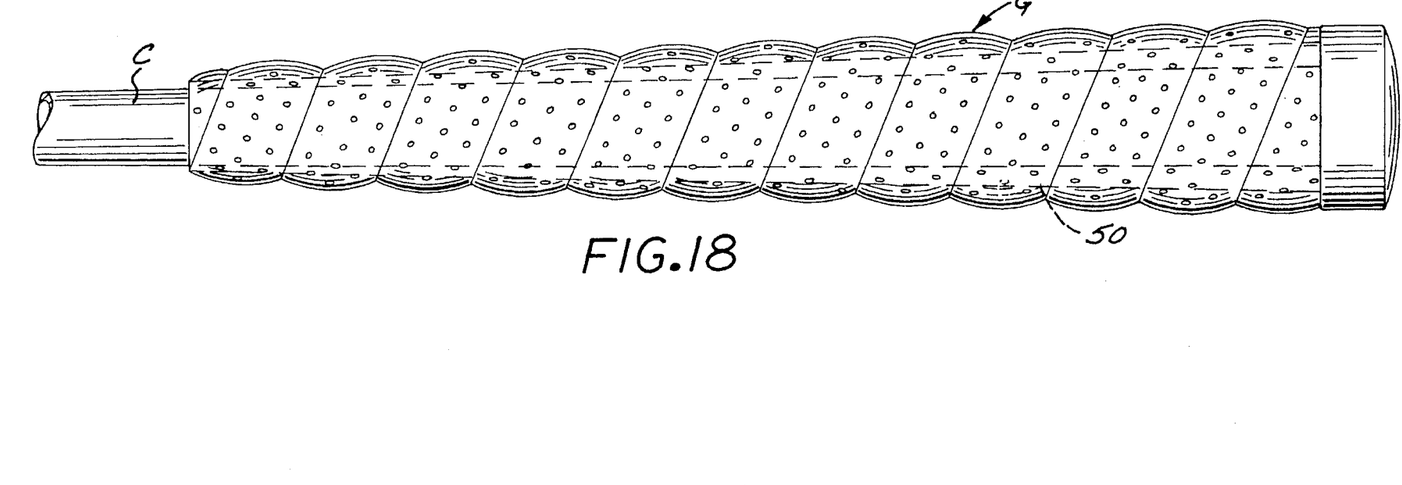
FIG. 18 is a view similar to FIG. 17 after the wrapping step of FIG. 17 has been completed so as to provide a golf club grip embodying the present invention.
Figure 19:
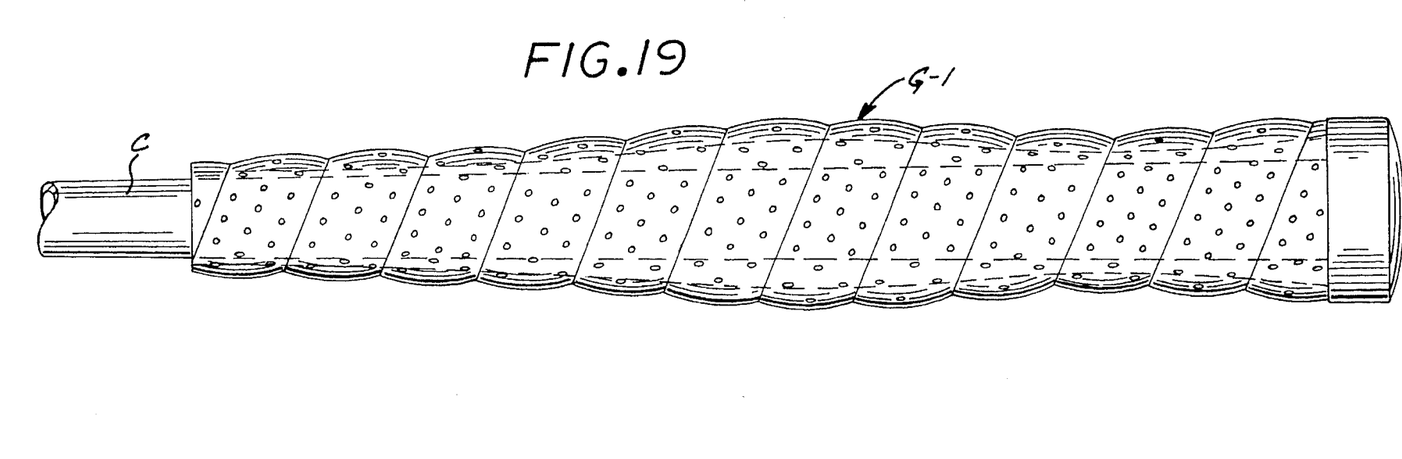
FIG. 19 is a view similar to FIG. 18 after the resilient strip of FIGS. 1–13 has been applied over the sleeve of FIG. 16 so as to provide a golf club grip embodying the present invention.

Referring now to FIG. 17, the resilient strip S is shown being wrapped spirally around sleeve 50 with the edges thereof being slightly overlapped. The length of the strip S should be so selected that, when the strip has been spirally wrapped about the sleeve 50 to the point such sleeve reaches the lower end of the sleeve, such lower end may be secured to the lower end of the sleeve and the golf club shaft as by means of an adhesive-backed tape (not shown). The spirally wrapped strip and the sleeve 50 will then define the golf club grip G shown in FIG. 18. If a split construction is utilized for sleeve 50, such sleeve will be securely held in place by the strip.

Figure 16:
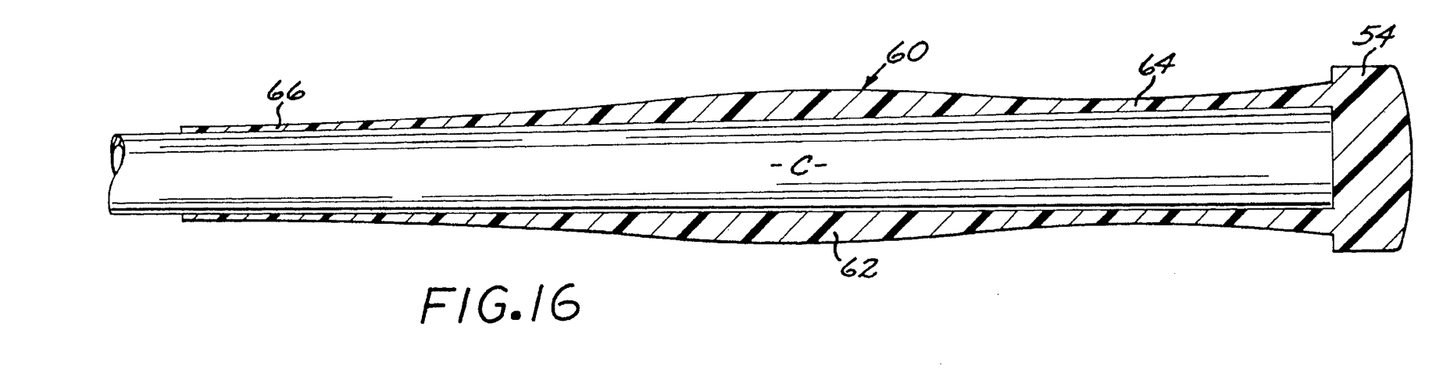
FIG. 16 is a view similar to FIG. 15 showing a second form of sleeve which may be utilized with the resilient strip of FIGS. 1–13.

Referring now to FIG. 16, there is shown a second form of resilient sleeve 60 which may be utilized to define a golf club grip embodying the present invention. The configuration of sleeve 60 is based upon the applicant's discovery that some golfers could obtain optimum control of a golf club by utilizing a grip wherein the intermediate longitudinal portion thereof is radially expanded relative to the diameter of the upper and lower portions of the grip. In accordance with such discovery, the applicant has provided the resilient sleeve, generally designated 60, shown in FIG. 16. Sleeve 60 is similar in construction to sleeve 50, but rather than being formed with a straight tapered profile, the intermediate portion of the sleeve is increased in radial diameter relative to the upper and lower portions of such sleeve, as indicated at 62. Preferably, the longitudinal profile of such sleeve affords a smooth transition between the intermediate portion 62 of upper and lower portions thereof, respectively designated 64 and 66. When the resilient strip S is spirally wrapped about sleeve 60, the completed grip G-1 will have the appearance shown in FIG. 19. With this arrangement, the palms of the golfer's hands (not shown) can grasp the grip with the pads of his hands to apply maximum gripping force at such intermediate portion. At the same time, the golfer's fingers can engage the grip at the reduced lower portion thereof to facilitate relaxation of the golfer's fingers on the grip thereby enhancing the golfer's ability to achieve a controlled swing. Note that sleeves 50 and 60 can be adhered to the golf club shaft if desired.

Figures 20, 21, 22:
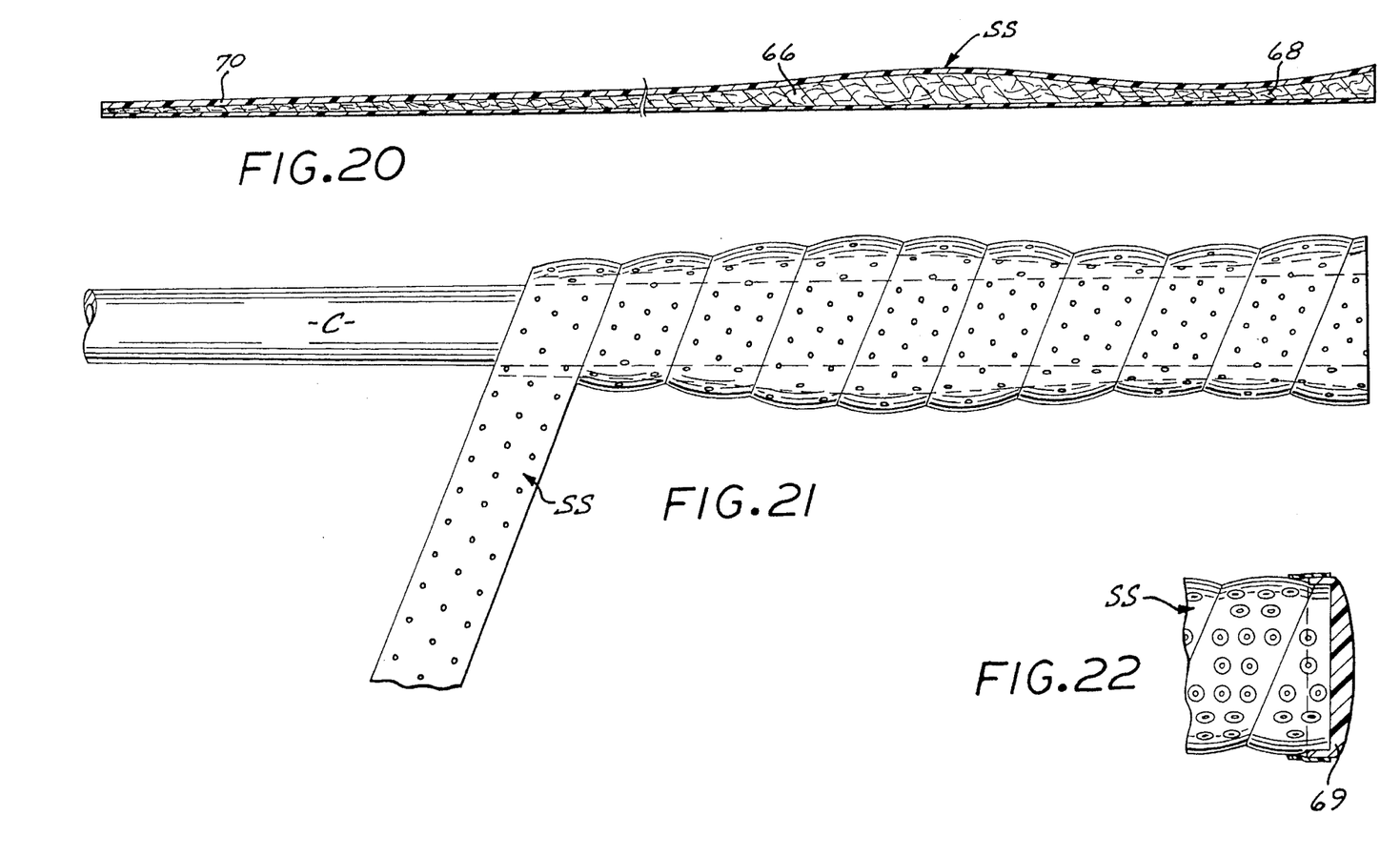
FIG. 20 is a side longitudinal sectional view in reduced scale similar to FIG. 1 showing a second form of resilient strip which is utilized to provide a golf club grip embodying the present invention.
FIG. 21 is a side elevational view showing the resilient strip of FIG. 20 being applied to a golf club shaft.
FIG. 22 is a broken longitudinal sectional view showing a cap used with the golf club grip of FIGS. 18 and 19.
Figures 23, 24:
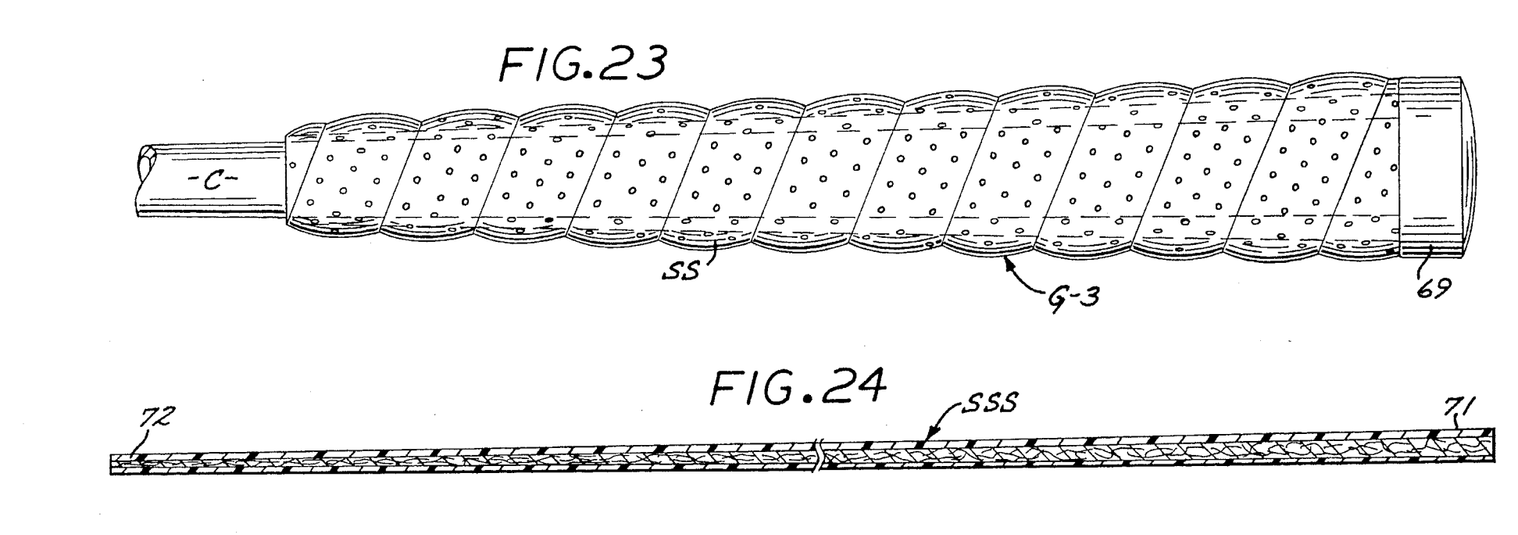
FIG. 23 is a side elevational view of a golf club grip embodying the present invention formed by the wrapping step of FIG. 21 has been completed.
FIG. 24 is a side longitudinal sectional view similar to FIG. 20 showing another form of resilient strip which may be utilized to provide a golf club grip embodying the present invention.

Referring now to FIGS. 20, 21, and 22, there is shown another form of golf club grip G-3 embodying the present invention. In this embodiment of the present invention, the side longitudinal profile of the resilient strip SS is not flat but, instead, has its intermediate portion 66 disposed at a higher elevation than the upper and lower ends 68 and 70 of the strip, as shown particularly in FIG. 20, i.e., the longitudinal profile resembles that of sleeve 60 shown in FIG. 16. In all other respects, resilient strip SS is constructed in the same manner as the heretofore described resilient strip S. Referring to FIG. 21, rather than employing a resilient sleeve 60 of the type shown in FIG. 16, the resilient strip SS is wrapped around the bare upper portion of the golf club shaft C, as indicated in this figure. The appearance of the resilient strip SS after it has been wrapped about the golf club shaft is shown in FIG. 23. It will be apparent that, because of the longitudinal profile of strip SS, the golf club grip G-3 shown in this figure will have a longitudinal profile similar to that provided by sleeve 60 and shown in FIG. 19, i.e., the intermediate portion of the grip will be of enlarged diameter relative the upper and lower portions thereof. The upper end of the golf club shaft may be provided with a resilient cap 69 shown in FIG. 22.

Figure 25:
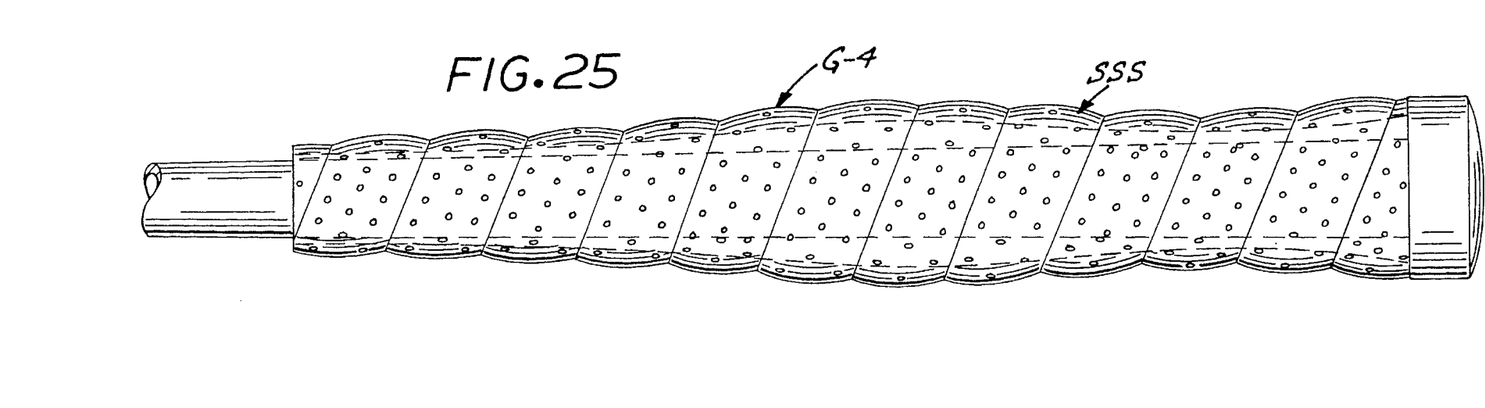
FIG. 25 is a side elevational view showing a golf club grip embodying the present invention formed after the resilient strip of FIG. 24 has been spirally wrapped about a golf club shaft.

Referring now to FIGS. 24 and 25, there is shown yet another form of golf club grip G-4 embodying the present invention. This form of grip utilizes a resilient strip SSS similar to the aforedescribed resilient strips, with the exception that the upper end 71 of the strip SSS, which is applied to the upper end of the golf club shaft C is greater than the height of the lower end 72 of the strip. Accordingly, as indicated in FIG. 25, when the strip SSS has been wrapped around the upper portion of the golf club shaft, the longitudinal profile of the resulting grip G-4 will be similar to that of the grip G shown in FIG. 18, i.e., the taper of the longitudinal profile of the grip will be greater than the longitudinal profile of the bare golf club shaft and the conventional grip (not shown) originally attached to the golf club shaft. Such arrangement permits the longitudinal profile of the grip and shaft to assume a desired configuration corresponding to the size and shape of the golfer's hands to thereby provide maximum comfort and enhance control over the golf club during play.

It should be noted that the aforedescribed golf club grips embodying the present invention may be utilized as original equipment on a golf club or, alternatively, may be utilized as replacements for an original golf club grip. Installation of the golf club grips of the present invention may be readily accomplished by the average golfer. Accordingly, the golfer is not required to leave his golf clubs at a golf shop for several days in order to have his original golf club grips replaced. Also, the cost of replacing an original golf club grip with a golf club grip embodying the present invention is less than the cost of replacing a conventional grip. Golf club grips embodying the present invention also provide a firm grasp of the grip by the golfer, even when such grip is dampened, as for example, when playing under rainy conditions or by contact with perspiration formed on the golfer's hands. Accordingly, the golfer can maintain a better hold on the grip than with conventional grips and can thereby maintain better control of his golf swing. Such control is enhanced by the tackiness inherent to the polyurethane layer of the grip. Also, golf club grips embodying the present invention enhance the player's feel and control during a swing by eliminating the need to wear a glove which is needed to protect abrasion of a conventional golf club grip. Each of the aforedescribed golf club grips embodying the present invention provide a grip having a longitudinal profile which may be tailored to the size and shape of an individual golfer so as to further enhance control of the golfer over a golf club.

Various modifications and changes may be made with respect to the foregoing detailed description without departing from the spirit of the claimed invention.

What is claimed is:

1. The combination of a golf club shaft and a grip applied to said shaft, wherein the grip comprises an elongated strip of resilient material formed from an open-pored textile layer having an inner surface adhered to and abutting the golf club shaft, and a smooth polyurethane layer formed with closed pores, said polyurethane layer being bonded to the surface of the textile layer remote from the golf club shaft, with the pores of such polyurethane layer extending generally normal to the longitudinal axis of the golf club shaft, and wherein the longitudinal profile of the grip tapers in a straight line from one of its ends to its opposite end whereby when the strip is spirally wrapped about the golf club shaft, the longitudinal profile of such strip and shaft defines a grip that tapers in a straight line form one of its ends to its opposite end at an angle greater than the angle at which the golf club shaft tapers.

2. The combination as set forth in claim 1 wherein said layers are formed with a plurality of vertical air passages.

3. The combination as set forth in claim 1 wherein the surface of the polyurethane layer remote from the golf club shaft is formed with treads.

4. The combination set forth in claim 3 wherein said layers are formed with a plurality of vertical air passages.

5. The combination as set forth in claim 4 wherein some of the treads intersect some of the vertical air passages.

* * * * *